(12) United States Patent
Wasserman et al.

(10) Patent No.: US 11,611,619 B2
(45) Date of Patent: *Mar. 21, 2023

(54) POLICY-BASED DATA PLACEMENT IN AN EDGE ENVIRONMENT

(71) Applicant: RED HAT, INC., Raleigh, NC (US)

(72) Inventors: Orit Wasserman, Mitzpe Aviv (IL); Marcel Apfelbaum, Afula (IL)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,951

(22) Filed: Jun. 24, 2022

(65) Prior Publication Data
US 2022/0321654 A1 Oct. 6, 2022

Related U.S. Application Data

(63) Continuation of application No. 17/130,385, filed on Dec. 22, 2020, now Pat. No. 11,405,456.

(51) Int. Cl.
*H04L 67/1097* (2022.01)

(52) U.S. Cl.
CPC ............................ *H04L 67/1097* (2013.01)

(58) Field of Classification Search
CPC .................................................. H04L 67/1097
See application file for complete search history.

(56) References Cited

U.S. PATENT DOCUMENTS

| | | | | |
|---|---|---|---|---|
| 7,739,239 B1* | 6/2010 | Cormie | .................. | G06F 16/134 |
| | | | | 707/637 |
| 7,899,763 B2* | 3/2011 | Machulsky | ........... | G06F 3/0659 |
| | | | | 706/12 |
| 8,935,493 B1* | 1/2015 | Dolan | .................. | G06F 3/0649 |
| | | | | 711/161 |
| 9,432,298 B1* | 8/2016 | Smith | ................. | H04L 49/9057 |
| 9,465,827 B1* | 10/2016 | Cox | .................... | G06Q 10/0639 |
| 10,095,425 B1* | 10/2018 | Martin | .................. | G06F 3/0665 |
| 10,216,423 B1* | 2/2019 | Malwankar | ............ | G06F 3/064 |
| 10,437,748 B1* | 10/2019 | Shalev | ................ | G06F 13/4027 |

(Continued)

FOREIGN PATENT DOCUMENTS

CN 111970323 A 11/2020

OTHER PUBLICATIONS

Breitbach, M., et al., "Context-Aware Data and Task Placement in Edge Computing Environments," IEEE International Conference on Pervasive Computing and Communications, 2019, http://sig-iss.work/percom2019/papers/p272-breitbach.pdf.

(Continued)

*Primary Examiner* — Jonathan A Bui
(74) *Attorney, Agent, or Firm* — Kilpatrick Townsend & Stockton LLP

(57) ABSTRACT

Data can be placed by an edge node in a computing environment using multiple criteria in a placement policy. For example, a processing device of an edge node can receive a write request for storing a data object. The processing device can select first and second criteria from a placement policy based on a tag for the data object. The processing device can determine a set of remote components that fulfill the first criterion. The processing device can then identify, from the set, a destination component that fulfills the second criterion. The processing device can transmit the data object to the destination component.

20 Claims, 3 Drawing Sheets

(56) References Cited

U.S. PATENT DOCUMENTS

| | | | |
|---|---|---|---|
| 10,637,783 B2 | 4/2020 | Krishna Singuru | |
| 2003/0046270 A1* | 3/2003 | Leung | G06F 16/22 |
| 2013/0132673 A1* | 5/2013 | Saito | G06F 3/065 |
| | | | 711/E12.017 |
| 2013/0159359 A1* | 6/2013 | Kumar | G06F 3/0667 |
| | | | 707/822 |
| 2015/0245160 A1* | 8/2015 | Agrawal | H04L 41/145 |
| | | | 455/406 |
| 2016/0085772 A1* | 3/2016 | Vermeulen | G06F 16/21 |
| | | | 707/615 |
| 2016/0359684 A1* | 12/2016 | Rizqi | G06F 3/0604 |
| 2017/0161184 A1* | 6/2017 | Colgrove | G06F 3/0631 |
| 2017/0277574 A1* | 9/2017 | Anami | G06F 9/505 |
| 2018/0260154 A1* | 9/2018 | Dronamraju | G06F 3/0685 |
| 2019/0158273 A1* | 5/2019 | Yasumoto | H04L 63/123 |
| 2019/0182226 A1* | 6/2019 | Bakthavachalam | |
| | | | H04L 63/0807 |
| 2019/0272383 A1* | 9/2019 | Luttwak | G06F 21/604 |
| 2020/0142735 A1 | 5/2020 | Maciocco et al. | |
| 2020/0366559 A1 | 11/2020 | Parvataneni et al. | |
| 2020/0371893 A1* | 11/2020 | Bhorkar | H04L 43/0817 |
| 2021/0168207 A1* | 6/2021 | Lin | H04L 67/1023 |
| 2021/0272035 A1* | 9/2021 | Pavlenko | G06F 16/13 |
| 2022/0019553 A1* | 1/2022 | Dixith | G06F 16/164 |

OTHER PUBLICATIONS

Liu, K., et al., "A Learning-based Data Placement Framework for Low Latency in Data Center Networks," IEEE Transactions on Cloud Computing, 2019, https://ieeexplore.ieee.org/abstract/document/8834843.

Salaht, F.A., et al., "An Overview of Service Placement Problem in Fog and Edge Computing," ACM Association for Computing Machinery, 2020, https://dl.acm.org/doi/abs/10.1145/3391196.

Shao, Y., et al., "A Data Replica Placement Strategy for IoT Workflows in Collaborative Edge and Cloud Environments," Computer Networks, 2018, https://www.sciencedirect.com/science/article/abs/pii/S1389128618311460.

Non-Final Office Action for U.S. Appl. No. 17/130,385 dated Jul. 13, 2021.

Final Office Action for U.S. Appl. No. 17/130,385 dated Dec. 8, 2021.

Advisory Action for U.S. Appl. No. 17/130,385 dated Feb. 7, 2022.

* cited by examiner

POLICY-BASED DATA PLACEMENT IN AN EDGE ENVIRONMENT

CROSS-REFERENCE TO RELATED APPLICATION

This is a continuation of and claims priority to U.S. patent application Ser. No. 17/130,385, filed Dec. 22, 2020, the entire disclosure of which is hereby incorporated herein by reference.

TECHNICAL FIELD

This disclosure relates generally to edge environments. More specifically, but not by way of limitation, the disclosure relates to data placement via an edge node of a computing environment.

BACKGROUND

A computing environment can include an edge environment for receiving communications from client devices that are external to the computing environment. The edge environment may be located physically or topologically closer to the client devices than more-central components of the computing environment, such as storage or processing devices. The edge environment can include edge nodes that may be physically or topologically closer to the client devices than the more-central components and that can relay information between the client devices and the central components. In some cases, the edge nodes can receive data from a large quantity of client devices and can place the data at a large quantity of server devices, such as servers in the computing environment. The edge nodes can rapidly place the received data with the server devices, for example, to reduce storage of data at the edge node, since storage space at the edge nodes may be limited. Placing data includes, for example, identifying a destination component for data that is received from client devices and transmitting the data to the identified destination component.

DETAILED DESCRIPTION

Figure 1:
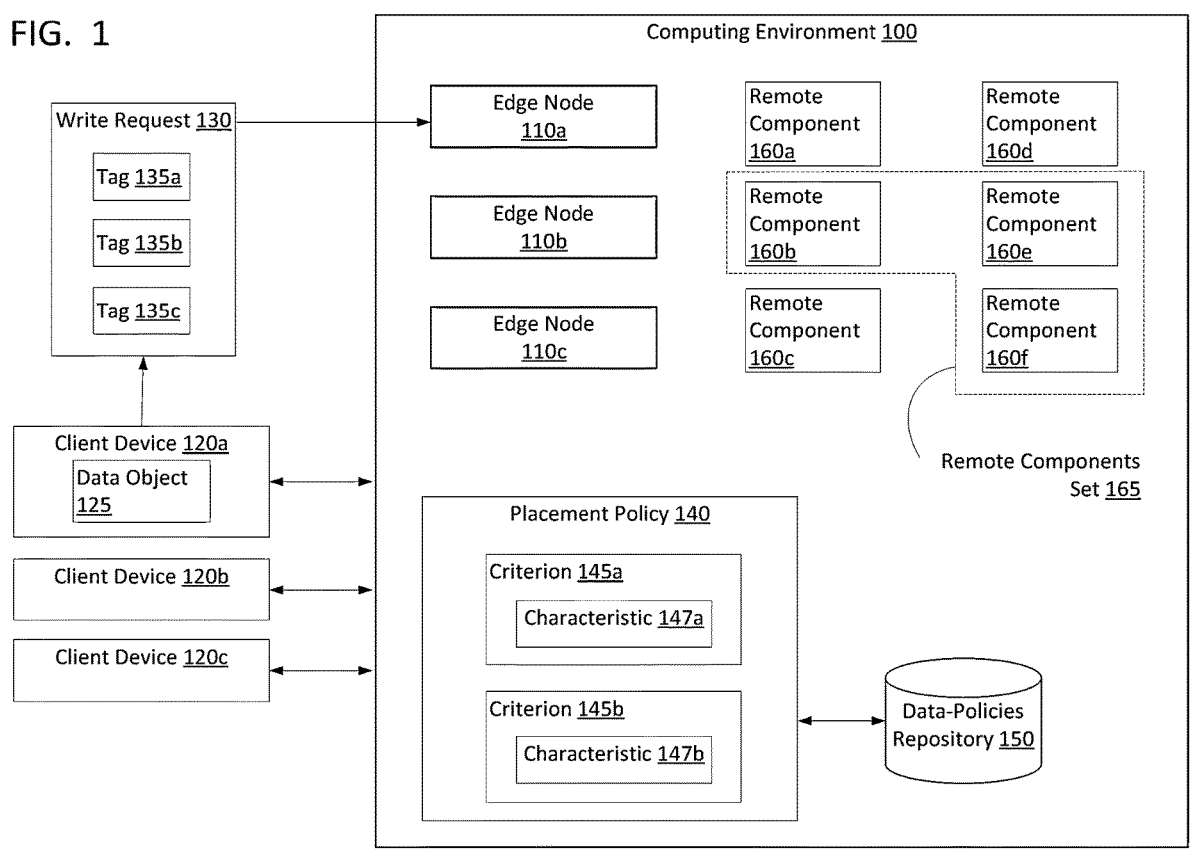
FIG. 1 is a block diagram of an example of a system for placing data received by an edge node in a computing environment according to some aspects of the present disclosure.

Edge environments can include an edge node, or a cluster of edge nodes, that can receive data from the client devices and select destination components on which to store the data. If the edge node has sufficient memory capacity, the edge node may select itself as the destination component on which to store the data. Alternatively, the edge node can transmit the data to a remote destination component for storing the data thereon. Examples of such remote destination components can include servers, storage components, a cloud computing environment, an additional client device, or other destination components that are in communication with the edge environment. This process of selecting a destination component on which to store (or otherwise process) the data is sometimes referred to as data placement. Ensuring that data is properly placed within the context of a larger computer environment can be a complex task that significantly influences the latency, security, and efficiency of the computer environment. Contemporary techniques for data placement tend to focus on a single objective, such as optimizing network latency or storage capacity at the edge nodes. But such inflexible, single-minded data placement techniques may not be suitable in all situations. For example, there may be multiple types of data objects with varying characteristics for which other considerations are more important than, or should be balanced against, minimizing network latency or storage capacity at the edge nodes. In addition, inflexible data placement techniques can cause inefficient placement of data or poor performance of the computer environment, such as overflow of local data buffers or storage, dropped network connections to client devices or destination components, poor data transmission, or other negative operating conditions. While an edge node could be upgraded to include additional storage or network capacity to mitigate such issues, these types of upgrades can be financially expensive and increase an environmental footprint of the edge environment, such as by increasing power consumption or use of raw materials for electronics.

Some examples of the present disclosure overcome one or more of the abovementioned problems by identifying a destination component at which to place a data object based on information describing the data objects and dynamic placement policies. The information describing the data object may be referred to herein as "tags." The tags associated with the data objects can be received concurrently with or separately from the data objects. For example, the tags can be received by an edge node prior to the edge node receiving the data object. In one such example, the tags can be included in a write request received from a client device, such as a write request that is received by the edge node prior to the data object being received by the edge node. Based on the tags, the edge node can use a placement policy to identify a destination component for the data object associated with the tags. For example, the edge node can determine multiple criteria from a placement policy based on one or more tags for a data object. Some criteria may be prioritized above other criteria, and the same criteria may be prioritized in different ways for different data objects. As a particular example, a first criterion can correspond to a required characteristic of the destination component, such as a network-topology characteristic. A second criterion can correspond to a prioritized characteristic of the destination component, such as a characteristic that might improve transmission of the data object without conflicting with the required characteristic. Using the placement policy, the edge node can rapidly identify a set of remote components with characteristics that fulfill the criteria for the data object. Having multiple types of criteria in the placement policy may improve the adaptability of the edge environment, such as by allowing the edge node to rapidly identify a destination component based on criteria with a hierarchy of importance. For example, the placement policy could include a hierarchy in which required characteristics are evaluated prior to prioritized characteristics. Using the placement policy, the edge node can select a set of remote components having the required characteristics, and then select the destination component from the set based on the destination having the prioritized characteristics.

Selecting the destination component based on the placement policy and the tags can allow the edge node to avoid analyzing the data object itself or storing the data object during the analysis. Since such analysis can consume significant amounts of computing resources, some examples described herein can avoid such resource consumption. Additionally, if the data object is relatively large and the destination for the data object is determined ahead of time (e.g., prior to receiving the data object), the edge node can begin transmission of the data object to the destination component upon receiving a portion of the data object, without applying resources to store the complete data object during transmission. For example, the edge node can forward the content of the data object to the destination component in a real-time data stream as the edge node receives the content of the data object from the client device. This can help increase speed and efficiency of data placement via an edge node that is included within an edge environment.

As a particular example, an edge environment can include a large number (e.g., hundreds or thousands) of edge nodes that can place data received from the client devices. The amount of data received can be relatively large, such as terabytes of data received from a group of thousands or tens of thousands of client devices. For instance, the client devices could include security cameras that transmit video data, via the edge environment, for processing or storage by a centralized computing system. In this example, the edge nodes have limited storage capacity and cannot possibly store all of the incoming data from the client devices. As a result, some of the data will need to be processed or stored at other components of the computing environment. To that end, the edge nodes can determine where to place the data in the computing environment and effectuate that data placement. In particular, the edge nodes can identify a destination component for the data based on tags associated with the data and placement policies. The edge nodes can then transmit the data to the identified destination component. Rapid and accurate placement of data by the edge node can significantly improve performance of the example edge environment, such as by increasing speed and efficiency of data transmission.

In this example, the edge environment can identify one or more requirements for handling the data based on tags associated with the data. Handling data includes processing, storing, or transmitting data. Different tags may correspond to different handling requirements, which may be defined in one or more policies. In some examples, the policies can be stored in a centralized computing system that is accessible to multiple edge nodes. Such a computing system may be referred to herein as a data-policies computing system. A large number of the example edge nodes can access the policies in the data-policies computing system to rapidly determine how to handle different types of data with different corresponding tags. The centralized accessibility of the data-policies computing system can improve the scalability of the edge environment, by allowing for more edge nodes to be rapidly added to the edge environment without having to individually configure each edge node with its own policies. In addition, the policies can be updated rapidly by the data-policies computing system, improving responsiveness of the edge environment to changes in data handling requirements.

As noted above, the edge nodes can place data rapidly and accurately based on the tags and placement policies. For example, an edge node can receive a write request from a client device, where the write request is for writing a data object to a computing environment. The write request includes information that describes the data object, such as one or more tags. Based on the one or more tags, the edge node determines a placement policy for the write request and evaluates criteria included in the placement policy. In some cases, the edge node can determine the placement policy based on the tags, such as selecting a particular placement policy from a group of placement policies by comparing the tags to a characteristic of the particular placement policy. In some cases, the edge node can evaluate the criteria of the placement policy based on the tags, such as by comparing the tags to information included in the criteria. The criteria of the placement policy could correspond to characteristics of a destination component for the data object. For example, the placement policy may require the destination component to have a particular network-topology characteristic. Examples of the network-topology characteristic can include a network location in a virtual topology of the computing environment, a geographical location in a physical topology of the computing environment, or another suitable location.

In the above example, the edge node can determine which remote components have the particular network-topology characteristic and consequently select those remote components as potential destination components. The edge node can then identify a particular component from the set of remote components as the destination component. The edge node may select the particular component based on another criterion defined in the placement policy, such as a criterion that corresponds to a characteristic by which the particular component is prioritized for selection as the destination. Based on identifying the destination component, the edge node can transmit the data object described by the write request to the destination component. In some cases, the edge node can identify the destination component using the above techniques prior to receiving the data object, allowing faster placement of the data object once it is received by the edge node.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example system for placing data received by an edge node in a computing environment 100. The computing environment 100 can include one or more edge nodes, such as at least an edge node 110a, an edge node 110b, and an edge node 110c (collectively referred to herein as edge nodes 110). In addition, the computing environment 100 can include one or more remote components that are located remotely from the edge nodes 110, such as remote components 160a, 160b, 160c, 160d, 160e, and 160f (collectively referred to herein as remote components 160). In some cases, the remote components 160 could include network components, storage components, processing components, or other suitable components of a computing environment. In the computing environment 100, the edge nodes 110 are geographically located at a relatively far distance from the remote components 160, such as a geographical distance of tens or hundreds of miles. In addition, the computing environment 100 can have a network topology arranged such that the edge nodes 110 are topologically located relatively close to the remote components 160, such as a network topology that provides a direct or nearly direct (e.g., one or two hops)

connection between the edge nodes 110 and the remote components 160. In this example, the computing environment 100 includes the edge nodes 110 and the remote components 160, but other implementations are possible. For example, a computing environment that is configured to place data could include more or fewer edge nodes or network-accessible components, as compared to the example computing environment 100.

In FIG. 1, client devices 120a, 120b, and 120c (collectively referred to herein as client devices 120) can connect to the computing environment 100 via the edge nodes 110. Examples of such client devices can be laptop computers, desktop computers, servers, sensors, Internet of Things ("IOT") devices, or mobile phones. For instance, the client devices 120 can request to write data to the computing environment 100. For example, the client device 120a can include (or otherwise have access to) a data object 125 that is to be written to the computing environment 100. To write the data object 125 to the computing environment 100, the client device 120a can transmit a write request 130 that is associated with the data object 125 to the computing environment 100. The write request 130 can indicate how the data object 125 is to be handled by the edge nodes 110 or the remote components 160. For instance, the write request 130 can indicate how the data object 125 is to be processed, stored, or transmitted in the computing environment 100. As one particular example, the write request 130 can indicate that the data object 125 is to be compressed, encrypted, analyzed, or otherwise processed in the computing environment 100. Additionally or alternatively, the write request 130 can indicate that the data object 125 is to be stored at a remote component included in the computing environment 100 or transmitted to an additional computing system that is in communication with the computing environment 100. This example is described in regards to the client devices 120 writing data to the computing environment 100, but in some cases, the client devices 120 may read data from the computing environment 100, including data previously written by one of the client devices 120.

In some cases, a subset of the client devices 120 might be associated with data handling requirements, such as security restrictions, legal restrictions, quality requirements (such as maintaining a threshold resolution of video data), or other requirements to be observed while transmitting, processing, or storing the data received from a particular subset of client devices 120. As an example, the client devices 120 could be associated with users who reside in a particular geographical jurisdiction in which laws of the particular geographical jurisdiction apply to data generated by the client devices 120. In addition, a particular one of the client devices 120 might be associated with data handling requirements, such as a requirement identifying a particular destination for the video data associated with a particular client device, such as storage for a user account associated with the particular client device. As an example, the client device 120c could be associated with a user account that identifies the remote component 160c as the destination component for data from the client device 120c.

In some examples, the write request 130 can include (or otherwise indicate) one or more tags that describe the data object 125, such as at least a tag 135a, a tag 135b, and a tag 135c (collectively referred to herein as tags 135). The tags 135 can indicate the requested handling of the data object 125. In addition, the tags 135 can indicate information describing the data object 125, such as a software application used to generate the data object 125, a type of data included in the data object 125, a security level of the data object 125, a user account associated with the data object 125, or any other suitable type of information. In some cases, the tags 135 can indicate information describing the client device 120a, such as an internet protocol address ("IP address") of the client device 120a, a user account associated with the client device 120a, a geographical location of the client device 120a, or any other suitable type of information. The tags 135 could be extracted from the write request 130 by a component of the computing environment 100. For example, the edge node 110a can extract the tags 135 from the write request 130. Additionally or alternatively, the tags 135 could be generated by a component of the computing environment 100. For example, the edge node 110a can generate a tag based on data included in the write request 130. As one specific example, a tag indicating a geographical location could be generated based on data indicating an IP address of the client device 120a.

The computing environment 100 can receive the write request 130, such as by the edge node 110a. In this example, the edge node 110a receives the write request 130 prior to receiving the data object 125. In response to receiving the write request 130, the edge node 110a accesses a placement policy 140 that is included in (or otherwise accessible by) the computing environment 100. For example, the placement policy 140 could be stored in a data-policies computing system, such as a data-policies repository 150 that is included in the computing environment 100. In some cases, the edge node 110a selects the placement policy 140 from multiple placement policies that are stored in the data-policies repository 150. For example, the edge node 110a might select the placement policy 140 based on one or more of the tags 135. For instance, if a particular one of the tags 135 indicates that the data object 125 includes video data, the edge node 110a could select the placement policy 140 based on a comparison of the particular tag to a characteristic indicating that the placement policy 140 is associated with video data. As another example, the edge node 110a might select the placement policy 140 based on a predesignated assignment of one or more of the tags 135 to the placement policy 140. For instance, the placement policy 140 may be preassigned for use with a particular one of the tags 135.

Having determined the placement policy 140, the edge node 110a can identify one or more criteria in the placement policy 140, such criterion 145a and criterion 145b (collectively referred to herein as criteria 145). Each of the criteria 145 can correspond to one or more characteristics of a destination component to which the data object 125 could be written. For example, the criterion 145a can correspond to a characteristic 147a, and the criterion 145b can correspond to a characteristic 147b. In this example, the characteristics 147a and 147b (collectively referred to herein as characteristics 147) can include one or more of a required characteristic, a prioritized characteristic, an efficiency characteristic, or any other suitable characteristic of a potential destination component. In some cases, the characteristics 147 can correspond to characteristics of additional components that could be used during placement of the data object 125, such as communication relay components that could be used during transmission of the data object 125.

In some cases, the placement policy 140 indicates a hierarchy by which the criteria 145 are to be evaluated. For example, the characteristics 147 could include at least one required characteristic at a high level of the policy hierarchy. A required characteristic is obligatory for a potential destination component of the data object 125. Examples of a required characteristic can include compliance with a legal restriction or a security restriction. Additionally or alternatively, the characteristics 147 could include at least one prioritized characteristic at an intermediate level of the policy hierarchy. A prioritized characteristic is a characteristic that is prioritized for a potential destination component. Prioritized characteristics are prioritized over other non-prioritized characteristics, but may still be of lower importance than a required characteristic. Additionally or alternatively, the characteristics 147 could include a secondary characteristic at a lower level of the policy hierarchy. A secondary characteristic may have a lower importance than a required characteristic or a prioritized characteristic. An example of such a secondary characteristic may be an efficiency characteristic. In some examples, one or more secondary characteristics may be used as a tie breaker when multiple potential destinations have the required characteristics and prioritized characteristics. It will be appreciated that any given placement policy may include any number and combination of criterion corresponding to any number and combination of required characteristics, prioritized characteristics, or secondary characteristics.

Having determined the criteria 145, the edge node 110*a* evaluates the criteria 145 to determine a potential destination component for the data object 125. Evaluation of the criteria 145 can include determining whether a potential destination component has characteristics corresponding to the criteria 145. In some cases, the evaluation is based on a comparison of the tags 135 with the placement policy 140 or the characteristics 147. For example, the edge node 110*a* can select the placement policy 140 based on information included in the tags 135. The criteria 145 can be evaluated according to a hierarchy indicated by the placement policy 140. For example, based on a first evaluation of the criteria 145*a*, the edge node 110*a* could determine a set of remote components 165 in the computing environment 100 that are suitable to receive the data object 125. The set of remote components 165 can be determined based on an evaluation of criteria at a higher level of policy hierarchy for the placement policy 140. For example, if the criterion 145*a* indicates a required characteristic 147*a* for data originating in a particular geographical location, the edge node 110*a* can determine the set of remote components 165 by identifying remote components that fulfill the criterion 145*a*. The evaluation of the criterion 145*a* could be based on the tag 135*a* indicating that the client device 120*a* is located in the particular geographical location.

After determining the set of remote components 165, the edge node 110*a* can determine a destination component in the set at which to place the data object 125. The edge node 110*a* can make this determination based on the hierarchical evaluation of the criteria 145. For example, based on a second evaluation of the criteria 145*b*, the edge node 110*a* could determine a particular component in the remote components set 165 that fulfills the criteria 145 in the placement policy 140. For example, if the criterion 145*b* indicates a prioritized characteristic 147*b* for a remote component having a particular level of security, the edge node 110*a* can identify the remote component 160*b* as the destination component for the data object 125 by identifying that the remote component 160*b* fulfills the criterion 145*a* and the criterion 145*b*. The evaluation of the criterion 145*b* could be based on the tag 135*b* indicating that the data object 125 is associated with the particular level of security.

In some cases, the remote components set 165 is reduced via comparisons with additional criteria from the placement policy 140, such as one or more additional criteria corresponding to additional required characteristics, prioritized characteristics, or secondary characteristics. In some examples, the edge node 110*a* can determine that a data object is to be handled in a certain manner that does not include transmission to a remote component. For example, the edge node 110*a* could perform processing related to the data object 125, and potentially return a result of the processing to the client device 120*a* (or an additional component of the computing environment 100). Additionally or alternatively, the edge node 110*a* could determine that the data object 125 is to be deleted, that the write request 130 is to be denied, that a network connection with the client device 120*a* is to be terminated, or other suitable steps that avoid receiving the data object 125.

If the data object is to be transmitted to the identified destination component, the edge node 110*a* can place the data object 125 with the identified destination component. For example, the edge node 110*a* can transmit the data object 125 to the remote component 160*b*. In this example, the edge node 110*a* can identify the destination component prior to receiving the data object 125. In some cases, placement by the edge node 110*a* can include providing information to transmit the data object 125 to the identified destination component, without the edge node 110*a* receiving the data object 125. For example, based on evaluation of the placement policy 140 and the write request 130, the edge node 110*a* could provide data to establish transmission between the client device 120*a* and the destination component, such as data describing a secure application programming interface ("API"), a virtual private network ("VPN"), or any other communication channel capable of carrying the data object 125. The data object 125 may then be transmitted from the edge node 110*a* to the identified destination component, without passing through the edge node 110*a*.

In some cases, the edge node 110*a* might not be suitable to receive the data object 125. For example, the edge node 110*a* could identify that it (i.e., the edge node 110*a*) fails to fulfill the criteria 145. Based on determining that the edge node 110*a* does not fulfill the criteria 145, the edge node 110*a* could direct the write request 130, or another indication, to an additional one of the edge nodes 110 that fulfills the criteria 145. For example, based on determining that the edge node 110*b* fulfills the criteria 145, the edge node 110 could forward the write request 130 to the edge node 110*b*. The edge node 110*b* could then place the data object 125 based on the write request 130, such as by identifying a destination component and transmitting the data object 125 to the destination component.

In some cases, the destination component can be a cloud computing system that is included in, or in communication with, the computing environment 100. For example, based on the evaluation of the criteria 145, the edge node 110*a* could identify, as the destination component, a public cloud computing system, a private cloud computing system, or a combination of cloud computing systems that are included in (or otherwise in communication with) the computing environment 100. In addition, the destination component can be an additional computing system that is included in, or in communication with, the computing environment 100. For example, based on the comparison of the tags 135 with the criteria 145, the edge node 110*a* could identify, as the destination component, a particular computing system having a particular identification address, such as a volume on a server that is identified via an IP address, a device name, or other suitable addressing technique.

Figure 2:
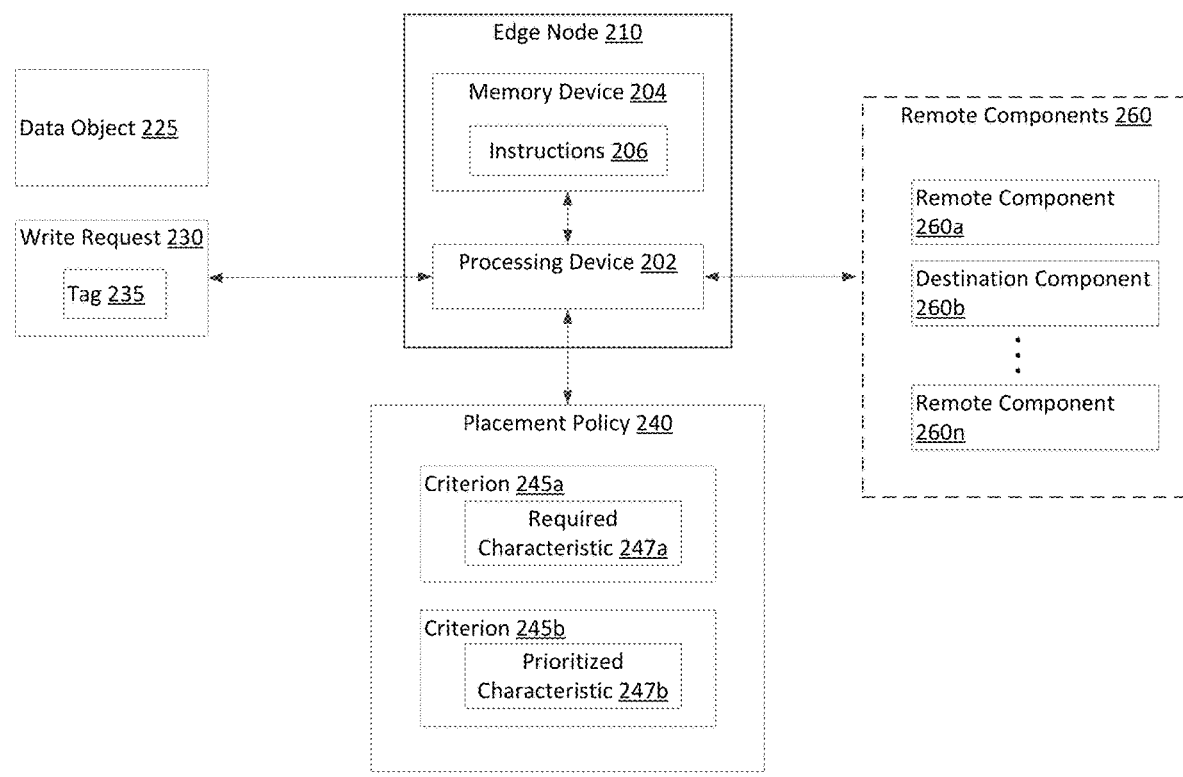
FIG. 2 is a block diagram of another example of a computing environment in which an edge node can place data according to some aspects of the present disclosure.

FIG. 2 is a block diagram of another example of a computing environment in which an edge node can place data, according to some aspects. The computing environment depicted in FIG. 2 includes a processing device 202 communicatively coupled with a memory device 204. In some examples, the processing device 202 and the memory device 204 can be part of an edge node 210, such as one of the edge nodes 110 of FIG. 1.

The processing device 202 can include one processing device or multiple processing devices. Examples of the processing device 202 include a field-programmable gate array ("FPGA"), an application-specific integrated circuit ("ASIC"), a microprocessor, etc. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, or any other suitable programming language.

The memory device 204 can include one memory device or multiple memory devices. The memory device 204 can be non-volatile and may include any type of memory device that retains stored information when powered off. Examples of the memory device 204 include electrically erasable and programmable read-only memory ("EEPROM"), flash memory, or any other type of non-volatile memory. In some examples, at least some of the memory device can include a medium from which the processing device 202 can read instructions 206. A computer-readable medium can include electronic, optical, magnetic, or other storage devices capable of providing the processing device 202 with computer-readable instructions or other program code. Examples of a computer-readable medium include magnetic disk(s), memory chip(s), read-only memory ("ROM"), random-access memory ("RAM"), an ASIC, a configured processor, optical storage, or any other medium from which a computer processor can read the instructions 206.

In some examples, the processing device 202 can receive a write request 230 from a client device, such as one of the client devices 120 from FIG. 1. The write request 230 can indicate a request to store a data object 225. In addition, the write request 230 can include a tag 235. The tag 235 can be associated with the data object 225, such as by including information describing the data object 225.

The processing device 202 can select a first criterion 245a and a second criterion 245b (collectively referred to herein as criteria 245) from a placement policy 240. The criteria 245 can be selected based on the tag 235. In some cases, the first criterion 245a can correspond to a required characteristic 247a of the placement policy 240. In addition, the second criterion 245b can correspond to a prioritized characteristic 247b of the placement policy 240. Examples of a required characteristic can include a network-topology characteristic that describes a relation of a remote component with respect to other remote components; a geographical characteristic that describes a geographical location of a remote component; a legal characteristic, such as a remote component that fulfills requirements of a contract or other legal obligation; a regulatory characteristic, such as a remote component that fulfills a governmental regulation; a security characteristic that describes a security status of a remote component; or any other suitable required characteristic of a remote component. Examples of a prioritized characteristic can include a network accessibility characteristic, a communication response characteristic, a component uptime characteristic, a capacity characteristic, or any other suitable characteristic by which a remote component could be prioritized for selection as a destination.

The processing device 202 can determine a set of remote components 260. Each remote component 260a-n in the set of remote components 260 can fulfill the first criterion 245a. The processing device 202 can determine the set of remote components 260 by evaluating the first criterion 245a of the placement policy 240.

After determining the set of remote components 260, the processing device 202 can identify a destination component for the data object 225 from the set of remote components 260. For example, the processing device 202 can identify the remote component 260b as the destination component. The processing device 202 can identify the destination component that fulfills the second criterion 245b. In some examples, the processing device 202 can determine the destination component 260b by evaluating the second criterion 245b of the placement policy 240. In this way, the destination component 260b is selected because it has the required characteristic 247a and the prioritized characteristic 247b. Based on identifying the destination component 260b, the processing device 202 can transmit the data object 225 to the destination component 260b.

As described above, the processing device 202 can identify the destination component 260b based on the destination component 260b having the required characteristic 247a and the prioritized characteristic 247b. In some cases, the processing device 202 can identify the destination component 260b based on the destination component 260b having an additional characteristic, such as an efficiency characteristic. The efficiency characteristic can correspond to an additional criterion of the placement policy 240, such as an efficiency criterion. The processing device 202 can determine that the destination component 260b has the efficiency characteristic by evaluating the efficiency criterion. In some cases, evaluation of the efficiency criterion is based on a comparison of the tag 235 with the efficiency criterion. Examples of an efficiency characteristic can include a latency characteristic, a storage characteristic, a financial characteristic (such as a cost of accessing a remote component), a processing characteristic, or any other suitable characteristic describing an efficiency of accessing a remote component.

Figure 3:
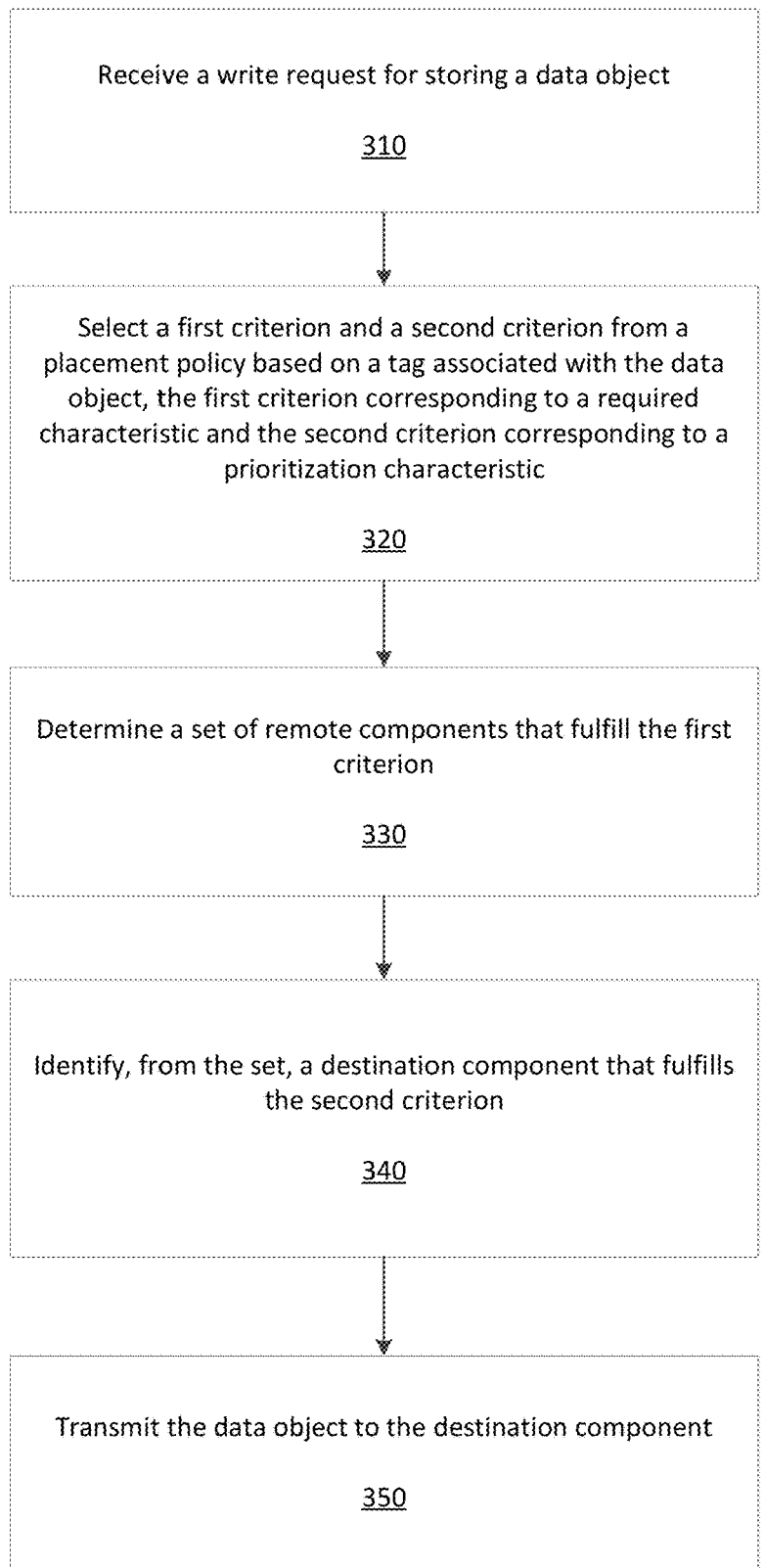
FIG. 3 is a flow chart of an example process for placing data received by an edge node in a computing environment according to some aspects of the present disclosure.

In some examples, the processing device 202 can implement some or all of the steps shown in FIG. 3. Other examples can include more steps, fewer steps, different steps, or a different order of the steps than is shown in FIG. 3. The steps of FIG. 3 are discussed below with reference to the components discussed above in relation to FIG. 2.

In block 310, the processing device 202 receives a write request 230 to store the data object. The edge node 210 could receive the write request 230 from a client device. In some cases, the write request 230 indicates a request to store the data object 225 to a computing environment.

In block 320, the processing device 202 selects a first criterion 245a and a second criterion 245b from a placement policy 240. The processing device 202 can select the first and second criteria 245 based on a tag 235 that is associated with the data object 225. In some cases, the first criterion 245a can correspond to a required characteristic 247a, such as a characteristic required to be observed during placement of the data object 225. Additionally or alternatively, the second criterion 245b can correspond to a prioritized characteristic 247b. In some examples, the processing device 202 can select the placement policy 240 from a plurality of placement policies that are included in a data-policies computing system, such as the data-policies repository 150.

In block 330, the processing device 202 determines a set of remote components that fulfill the first criterion 245a. The processing device 202 can determine the set of remote components based on an evaluation of the first criterion 245a. Evaluation of the first criterion 245a may involve determining which remote components have characteristics that satisfy the first criterion 245a.

In block 340, the processing device 202 identifies the destination component 260b from the set of remote components 260. In addition, the processing device 202 identifies the destination component 260b that fulfills the second criterion 245b. For example, the processing device 202 can identify the destination component 260b by evaluating the second criterion 245b of the placement policy 240. Evaluation of the second criterion 245b may involve determining which remote components have characteristics that satisfy the second criterion 245b.

In block 350, the processing device 202 transmits the data object 225 to the destination component 260b. in some cases, transmitting the data object 225 is in response to identifying the destination component 260b.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. An edge node comprising:
a processing device that includes hardware; and
a memory device including instructions that are executable by the processing device for causing the processing device to:
receive a write request for storing a data object;
select a placement policy from among a plurality of placement policies stored in a repository based on a tag for the data object, each placement policy in the plurality of placement policies having a respective plurality of criteria usable for evaluating a group of candidate destinations to determine target destinations at which to store data objects;
identify a first criterion and a second criterion in the placement policy, the first criterion and the second criterion being usable for evaluating the group of candidate destinations to determine a target destination at which to store the data object;
determine a set of destinations, from among the group of candidate destinations, having characteristics that fulfill the first criterion;
identify, from the set of destinations, a particular destination that fulfills the second criterion for use as the target destination; and
transmit the data object to the target destination.

2. The edge node of claim 1, wherein the first criterion corresponds to a network-topology characteristic, a legal characteristic, a geographical characteristic, or a security characteristic; and
wherein the second criterion corresponds to a network accessibility characteristic, a communication response characteristic, or a component uptime characteristic.

3. The edge node of claim 1, wherein the memory device further includes instructions that are executable by the processing device for causing the processing device to:
identify a third criterion in the placement policy; and
select the target destination based on the target destination satisfying the third criterion.

4. The edge node of claim 3, wherein the third criterion corresponds to a financial characteristic, a latency characteristic, a storage characteristic, or a processing characteristic.

5. The edge node of claim 1, wherein the memory device further includes instructions that are executable by the processing device for causing the processing device to:
evaluate a set of criteria in the placement policy based on the tag by comparing the tag to information in the set of criteria.

6. The edge node of claim 1, wherein the tag describes one or more characteristics of the data object.

7. The edge node of claim 1, wherein the tag describes one or more characteristics of a client device that transmitted the write request.

8. The edge node of claim 1, wherein the memory device further includes instructions that are executable by the processing device for causing the processing device to, subsequent to determining the target destination:
provide data to a client device that transmitted the write request, the data being usable by the client device to establish a network connection to the target destination for transmitting the data object to the target destination without the data object passing through the edge node.

9. The edge node of claim 1, wherein the memory device further includes instructions that are executable by the processing device for causing the processing device to extract the tag from the write request.

10. The edge node of claim 1, wherein the memory device further includes instructions that are executable by the processing device for causing the processing device to generate the tag based on data included in the write request, the data being different from the tag.

11. The edge node of claim 1, wherein the memory device further includes instructions that are executable by the processing device for causing the processing device to identify the target destination prior to receiving the data object.

12. The edge node of claim 1, wherein the memory device further includes instructions that are executable by the processing device for causing the processing device to receive the data object separately from receiving the write request.

13. A method comprising:
receiving, by a processing device, a write request for storing a data object;
selecting, by the processing device, a placement policy from among a plurality of placement policies stored in a repository based on a tag for the data object, each placement policy in the plurality of placement policies having a respective plurality of criteria usable for evaluating a group of candidate destinations to determine target destinations at which to store data objects;
identifying, by the processing device, a first criterion and a second criterion in the placement policy, wherein the first criterion and the second criterion are usable for evaluating the group of candidate destinations to determine a target destination at which to store the data object;
determining, by the processing device, a set of destinations, from among the group of candidate destinations, having characteristics that fulfill the first criterion;
identifying, by the processing device and from the set of destinations, a particular destination that fulfills the second criterion for use as the target destination; and
transmitting, by the processing device, the data object to the target destination.

14. The method of claim 13, wherein the first criterion corresponds to a network-topology characteristic, a legal characteristic, a geographical characteristic, or a security characteristic; and
    wherein the second criterion corresponds to a network accessibility characteristic, a communication response characteristic, or a component uptime characteristic.

15. The method of claim 13, further comprising:
    identifying, by the processing device, a third criterion in the placement policy; and
    selecting, by the processing device, the target destination based on the target destination satisfying the third criterion.

16. The method of claim 13, further comprising evaluating a set of criteria in the placement policy based on the tag by comparing the tag to information in the set of criteria.

17. The method of claim 13, wherein the tag describes one or more characteristics of the data object or of a client device that transmitted the write request.

18. The method of claim 13, further comprising extracting the tag from the write request.

19. The method of claim 13, further comprising generating the tag based on data included in the write request, the data being different from the tag.

20. A non-transitory computer-readable medium comprising program code that is executable by a processing device that includes hardware for causing the processing device to:
    receive a write request for storing a data object;
    select a placement policy from among a plurality of placement policies stored in a repository based on a tag for the data object, each placement policy in the plurality of placement policies having a respective plurality of criteria usable for evaluating a group of candidate destinations to determine target destinations at which to store data objects;
    identify a first criterion and a second criterion in the placement policy, the first criterion and the second criterion being usable for evaluating the group of candidate destinations to determine a target destination at which to store the data object;
    determine a set of destinations, from among the group of candidate destinations, having characteristics that fulfill the first criterion;
    identify, from the set of destinations, a particular destination that fulfills the second criterion for use as the target destination; and
    transmit the data object to the target destination.

\* \* \* \* \*